(No Model.)
D. SHIVE.
COMPENSATION PENDULUM.
No. 279,828. Patented June 19, 1883.
Fig. 1. Fig. 2.
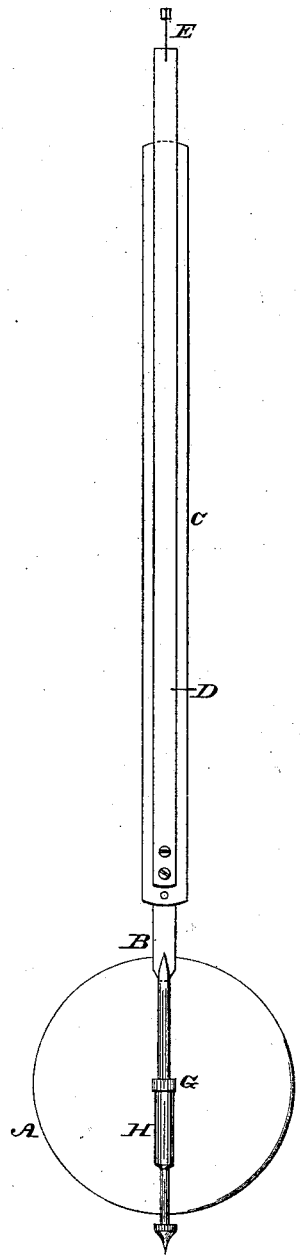 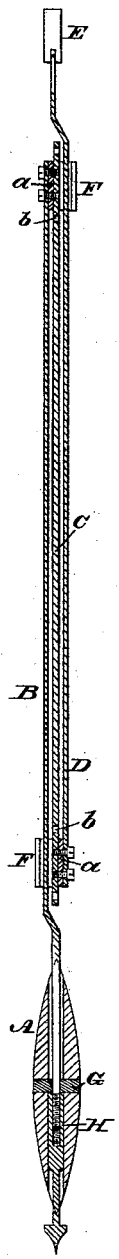
Fig. 3.
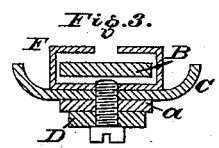
Fig. 4.
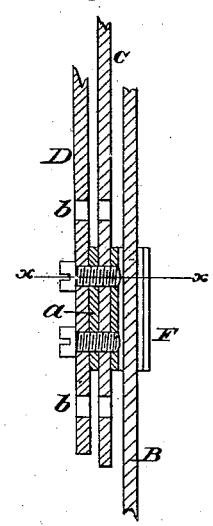
Witnesses:
A. P. Grant,
W. F. Kircher
Inventor:
David Shive,
by John A. Wiedersheim
ATTORNEY.

UNITED STATES PATENT OFFICE.

DAVID SHIVE, OF PHILADELPHIA, PENNSYLVANIA, ASSIGNOR OF ONE-HALF TO B. F. DU BOIS, OF SAME PLACE.

COMPENSATION-PENDULUM.

SPECIFICATION forming part of Letters Patent No. 279,828, dated June 19, 1883.

Application filed May 4, 1881. Renewed April 17, 1883. (No model.)

*To all whom it may concern:*

Be it known that I, DAVID SHIVE, a citizen of the United States, residing in the city and county of Philadelphia, and State of Pennsylvania, have invented a new and useful Improvement in Pendulums, which improvement is fully set forth in the following specification and accompanying drawings, in which—

Figure 1 is a rear view of the pendulum embodying my invention. Fig. 2 is a central vertical section thereof. Fig. 3 is a horizontal section in line $xx$, Fig. 4. Fig. 4 is a view of a portion of Fig. 2 enlarged.

Similar letters of reference indicate corresponding portions in the several figures.

My invention consists of a pendulum-rod formed of rods or plates which are constructed of different metals whose expansive properties are in reverse ratio, so as to compensate for the effects of heat and cold on the suspension rods or plates. Said rods or plates are connected at opposite ends and provided with guards at opposite sides of the top and bottom, whereby a simple and inexpensive device is produced, the rods or plates being prevented from separating to an undue extent by said guards.

It also consists of means for increasing the strength of the pendulum-rod, which is formed of comparatively light or thin metal.

Referring to the drawings, A represents the pendulum-ball, which is suspended from the steel or wrought-iron strip or rod B, whose upper end is firmly connected to the upper end of a zinc rod or plate, C.

D represents a steel or wrought-iron rod or strip, which is suspended from the pendulum-spring E, and firmly connected at its lower end to the lower end of the zinc rod or plate C, so that the rods B D are on opposite sides of the plate C.

The expansive property of zinc as compared with steel is nearly 2.6 to 1. Consequently the lengths of the metal pieces B C D are in reverse ratio of their expansive properties. In order to have the action of expansion and contraction free and perfect, it is essential that all contact of the parts B C D one against the other, excepting where they are connected, be scrupulously avoided, as all such contact, and consequent friction, is detrimental to the proper action of the pendulum. For this purpose steel plates $a$ are placed between the steel and zinc, where they are joined, whereby the distance of separation of the two metals is maintained from end to end, said steel plates also affording firm holds for the fastening-screws and securely connecting the parts, as the zinc alone is not sufficiently strong for the connection of the screws.

In Figs. 3 and 4, I show more clearly the steel plate at the rear of the zinc bent into loop form, as at F, so as to encircle the steel or iron rod or strip B and guard against bending of the rods, there, however, being no contact of the loop with said rod or strip B unless accidentally occasioned. The rods or plates have a number of extra openings, $b$, one above the other, for the purpose of adjusting the length of the pendulum, and the zinc plate is bent or channeled longitudinally, and thereby stiffened and strengthened.

G represents a nut secured to or formed with the pendulum-ball centrally at the rear thereof. Through this nut is passed the lower end of the pendulum-rod, said end being threaded and fitted into a threaded opening or socket of an adjusting-rod, H, which is thus suspended from the end of the pendulum-rod below said nut G. The lower edge of the nut G is in the center of the ball, by which point the ball is suspended, there being no contact at the bottom of the ball. All parts taking action in the compensation should not vary greatly in thickness and should be equally exposed to the atmosphere. When these conditions do not exist, there is no perfect compensation. Lead, of which the pendulum-ball is composed, has double the expansive property of steel. It then follows that a ball suspended by its lower edge takes strong part in compensation; but if suspended in the center each half will balance the opposite half and the center—the point of suspension—become neutral. If the ball takes part in compensation, its action must be at the wrong time, as the mass of lead will not change temperature at the same time with the light rods. For the same reason, also, tubes with rods inside should be discarded.

All parts of a pendulum thus constructed will act harmoniously, and each part at the same temperature will return to the same position, whatever may have been the change in expansion and contraction, without requiring a weight to bring it back, and it will be found that there is produced a perfect and at the same time a cheap plan of constructing a compensating pendulum. For a pendulum beating seconds, there are used two light rods of steel, each less than three feet in length, and one strip of rolled sheet-zinc one inch and a half wide, one-sixteenth of an inch thick, and less than two and a half feet long. This strip of zinc, if bent in the form represented in Fig. 3, will bear a ball of thirty or forty pounds weight.

For a small clock, a quite light strip of zinc and two rods of iron wire riveted to the zinc will give perfect compensation for heat and cold, the expense involved being trifling.

To secure the expansive property of zinc, it is necessary that the crystalline structure be thoroughly broken up. This is in no manner so effectually accomplished as in rolling into sheet plates.

Having thus described my invention, what I claim as new, and desire to secure by Letters Patent, is—

1. The rods or plates B C D, connected at top and bottom on opposite ends, as described, in combination with the guards F, secured to said ends on opposite sides thereof, substantially as and for the purpose set forth.

2. A compensation pendulum-rod constructed of light or thin metal, having the sides of one of its plates bent or flanged, whereby a proper rigidity is given to the said plate, as set forth.

DAVID SHIVE.

Witnesses:
JOHN A. WIEDERSHEIM,
F. COOPER.